(12) United States Patent
Crowell (10) Patent No.: US 7,243,059 B2
(45) Date of Patent: Jul. 10, 2007

(54) SIMULATION OF HARDWARE BASED ON SMART BUFFER OBJECTS

(75) Inventor: Daniel M. Crowell, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 10/422,689

(22) Filed: Apr. 24, 2003

(65) Prior Publication Data

US 2004/0215440 A1  Oct. 28, 2004

(51) Int. Cl.
- G06F 9/45 (2006.01)
- G06F 17/50 (2006.01)
- G06F 11/00 (2006.01)
- G06F 9/44 (2006.01)

(52) U.S. Cl. .......................... 703/22; 703/14; 703/21; 714/38; 717/131; 717/135

(58) Field of Classification Search .................. 703/21, 703/14, 22; 714/38; 717/131–133, 35, 135
See application file for complete search history.

(56) References Cited

U.S. PATENT DOCUMENTS 6,842,883 B2 * 1/2005 Whitehill ....................... 716/4

OTHER PUBLICATIONS

David Becker, et. al., Jun. 1992 pp. 129-134, 29th ACM/IEEE 8-12, An engineering environment for hardware/software co-simulation.*
Ashenden, 2002, Academic press, A harcourt science and technology company, "The designer's guide to VHDL Second Edition".*
Wanzenried, R., Mar. 1994, Verilog HDL Conference, 1994., International, pp. 29-36, Structured board level simulation using Verilog.*
Ferrandi, F. et. al., Design, Automation and Test in Europe, 2001. Conference and Exhibition 2001. Proceedings Mar. 13-16, 2001 pp. 403-410, Functional test generation for behaviorally sequential models.*

* cited by examiner

Primary Examiner—Paul Rodriguez
Assistant Examiner—Eun H Chung
(74) Attorney, Agent, or Firm—Patterson & Sheridan (57) ABSTRACT

Methods, articles of manufacture, and systems for software simulation of hardware, for use in testing firmware, are provided. The software simulation may be accomplished through the creation and use of a set of intelligent buffer objects (hereinafter "smart buffers") corresponding to registers (e.g., status, control, and results registers) in actual hardware targeted by the firmware. When accessed, the smart buffers may call specialized functions (or behavior actions) designed to simulate (expected or unexpected) behavior of the targeted hardware by modifying smart buffers associated with the same or other hardware registers. The simulated behavior of the hardware may allow the firmware code to be properly exercised as if running on an actual product platform.

17 Claims, 5 Drawing Sheets

BEHAVIOR DEFINITION — 134_A

- LABEL = [UPDATE STATUS REG A] WATCH = [A_REG_C] — 131_A
- CAUSE : TARGET = [A_REG_C] OP [SETBIT] BIT = [0]
- EFFECT : TARGET = [A_REG_S] OP = [SETBIT] BIT = [13]
- COMMENT : SETTING BIT 0 OF CONTROL REGISTER [A_REG_C] CAUSES BIT 13 OF STATUS REGISTER [A_REG_S] TO BE SET

BEHAVIOR DEFINITION — 134_B

- LABEL = [MIRROR STATUS REG A] WATCH = [A_REG_S] — 131_B
- EFFECT : TARGET = [B_REG_S] OP = [EQUAL TO] DATA = [A_REG_S] OFFSET = [20]
- COMMENT : COPY CHIP A STATUS REGISTER INTO CHIP B STATUS REGISTER STARTING AT BIT 20

SIMULATION OF HARDWARE BASED ON SMART BUFFER OBJECTS

BACKGROUND OF THE INVENTION

1. Field of the Invention

The present invention generally relates to software development and more particularly to the simulation of hardware targeted by software being developed.

2. Description of the Related Art

Firmware generally refers to specialized software that typically includes low level machine readable code (i.e., microcode) used to provide an interface to various hardware components while isolating higher level software (i.e., an operating system or application running thereon) from the details of that hardware access. Typically, firmware is developed and tested like other types of software: a firmware specification is created based on the needs of a particular application, firmware is developed based on the specification, and the firmware is tested.

One of the common objectives accomplished in firmware is to configure hardware components, for example, in preparation for an intended use when a system is first powered up. Therefore, it is difficult to test firmware code without running on the actual hardware. In an effort to speed time to market, it is common to develop firmware and hardware in parallel. Unfortunately, while firmware testing needs to be done as soon as possible, often the hardware the firmware targets is not available. To prevent the unavailability of hardware from postponing firmware testing, operation of the firmware may be simulated, as if it were running with the targeted hardware.

There are generally two basic commonly used approaches to simulate firmware as if it were running in hardware, both with advantages and disadvantages. The first approach and, arguably the simplest, is software simulation that typically employs compiler flags, debuggers, and other such devices, to control the execution flow of the firmware, in an effort to "exercise" as much of the code as possible. In other words, the firmware code may be manually modified to force a particular path of execution, as if an identified hardware condition existed, in order to test a corresponding portion of the code. An advantage to this approach is that it requires very little preparation for each execution. However, this testing is likely to be manual (as execution paths are manually forced), and in order to exercise the firmware as if it were being run on the actual hardware, several iterations may be required, which may be extremely time consuming.

The second approach is to use a complete hardware emulation. Hardware emulation generally involves specialized equipment designed to behave in a nearly identical manner to the actual hardware being emulated. For example, an emulator for a hardware component may be developed based on the same hardware descriptive language (e.g., VHDL) that was used to build the emulated hardware. However, the specialized equipment used for emulation is typically very expensive and, even with the specialized equipment, emulation of the hardware may be relatively slow. For example, a typical operation that may take 100 milliseconds (ms) in the actual hardware may take several minutes in the emulator.

Accordingly, there is a need for an improved method for testing firmware, as if it were running in the actual hardware it targets.

SUMMARY OF THE INVENTION

The present invention generally is directed to methods, articles of manufacture and systems for simulated testing of firmware without running on the actual hardware the firmware targets.

One embodiment provides a method of simulating, in software, the behavior of one or more hardware components is provided. The method generally includes creating one or more smart buffer objects, each corresponding to a register of at least one of the hardware components, creating one or more behavior definitions, each associated with at least one of the smart buffer objects, wherein the behavior definition specifies a modification to a smart buffer object, executing firmware code, and, in response to determining the firmware code accesses a first one of the smart buffer objects, modifying a second smart buffer object based on at least one behavior definition associated with the first smart buffer object.

Another embodiment provides a method of testing firmware that targets one or more hardware components. The method generally includes providing one or more smart buffer objects, each corresponding to a hardware register of at least one of the hardware components, providing, within the firmware, instructions for accessing the one or more smart buffer objects, and, in response to accessing a first smart buffer object, analyzing the behavior of at least a second smart buffer object caused by accessing the first smart buffer object.

Another embodiment provides a computer readable medium containing a program for simulating the behavior of hardware components targeted by firmware code. When executed, the program performs operations generally including creating one or more smart buffer objects, each corresponding to a register of one of the targeted hardware components, associating one or more behavior definitions with each smart buffer object, each behavior definition specifying a modification to a smart buffer, and, in response to detecting an access of a first smart buffer object by the firmware code, analyzing the behavior of at least a second smart buffer object caused by accessing the first smart buffer object, based on the one or more behavior definitions associated with the first smart buffer object.

Another embodiment provides a system for simulating one or more hardware components targeted by firmware code generally including at least one processor, a plurality of smart buffer objects, each associated with a corresponding register of one of the hardware components, a plurality of behavior definitions, each associated with at least one of the smart buffer objects, wherein each behavior definition specifies a modification to at least one smart buffer object, firmware code executable by the at least one processor, the firmware code including instructions to access the smart buffer objects, and a simulator. The simulator is generally configured to detect accesses to the smart buffer objects by the firmware code and modify one or more of the smart buffer objects, based on the plurality of behavior definitions, in response to the detected accesses.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to methods, articles of manufacture and systems for simulated testing of firmware without running on the actual hardware the firmware targets. In contrast to the prior art, embodiments of the present invention allow debugging of largely unmodified firmware code by providing a software simulation of targeted hardware components. The software simulation may be accomplished through the creation and use of a set of intelligent buffer objects (hereinafter "smart buffers") corresponding to registers (e.g., status, control, and results registers) in the actual targeted hardware.

When accessed, the smart buffers may call specialized functions (or behavior actions) designed to simulate behavior of the targeted hardware by modifying smart buffers associated with the same or other hardware registers, based on behavior definitions associated with the smart buffers. In other words, the behavior definitions may be developed, based on the targeted hardware specifications, to capture the cause and effect behavior of the actual registers of the targeted hardware. As used herein, the term firmware generally describes any set of executable software code (i.e., program and data) designed to interface with (e.g., read, write, modify) hardware components.

Exemplary Application Environment

Figure 1:
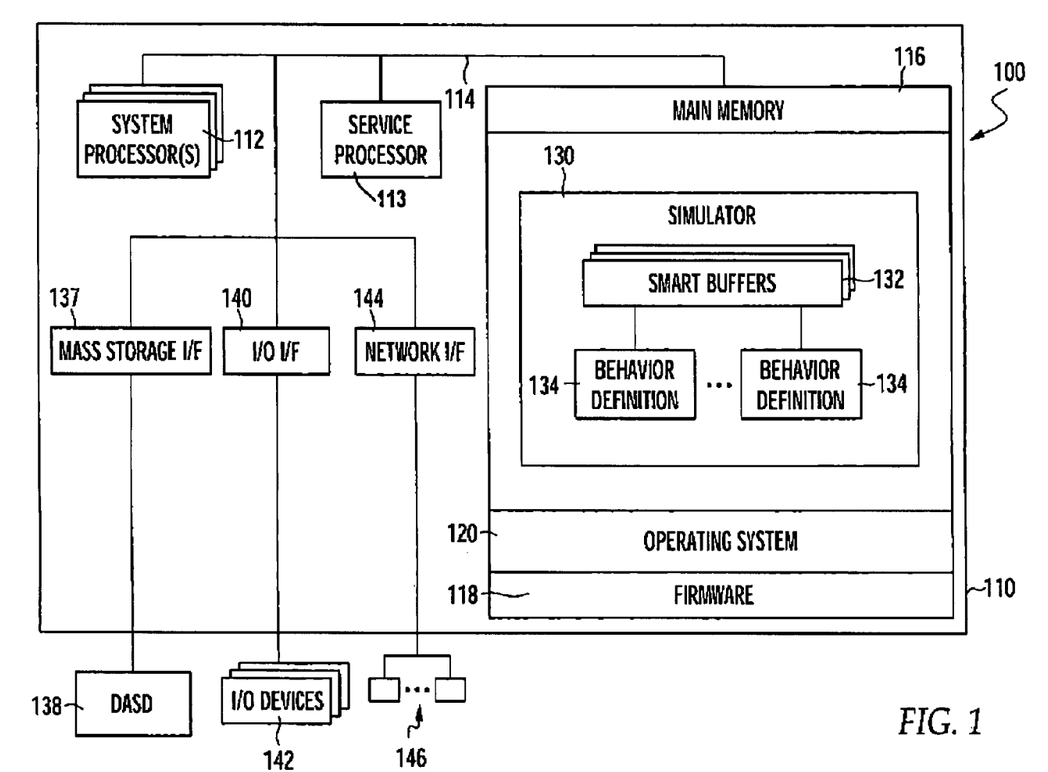
FIG. 1 is an exemplary computer system illustratively utilized in accordance with the present invention.

FIG. 1 shows an exemplary computer system 100, in which embodiments of the present invention may be utilized. For example, embodiments of the present invention may be implemented as a program product for use with the system 100, to debug firmware code 118 generally designed to configure one or more of the illustrated hardware components. The firmware code 118 may be executed by one or more system processors 112 or a service processor 113. The program(s) of the program product defines functions of the embodiments (including the methods described herein) and can be contained on a variety of signal-bearing media.

Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

The computer system 100 shown in FIG. 1 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries computer system available from International Business Machines (IBM) of Armonk, N.Y.

As illustrated, the computer system 100 generally include one or more system processors 112 and may also include a service processor 113. Each processor may be connected via a bus 114 to a memory 116, and any number of hardware components, including, but not limited to, a mass storage interface 137, I/O interface 140, and a network interface 144. The mass storage interface 137 may be operably connected to any suitable storage device, such as a direct access storage device (DASD) 138. The I/O interface 140 may include any number of hardware interface components suitable to operably connect with any type and combination of one or more I/O devices 142. The network interface 144 may be operably connected to a plurality of networked devices 146, which may include any type of networked devices, including networked-storage devices, networked printers, and other networked computers.

The memory 116 may be any suitable type system memory, such as a random-access memory (RAM) sufficiently large to hold the necessary programming and data structures of the invention. While the memory 116 is shown as a single entity, it should be understood that the memory 116 may in fact comprise a plurality of modules, and that the memory 116 may exist at multiple levels, from high speed registers and caches to lower speed but larger DRAM chips.

Illustratively, the memory 116 contains an operating system 120, which may represent any suitable operating system, such as IBM's OS/400, IBM's AIX, Linux, and the like. For some embodiments, the computer system 100 may be logically partitioned with each partition running its own operating system. In such an embodiment, system resources, such as the system processors 112 and memory 116 may be allocated among the logical partitions using well known logical partitioning schemes. Background information regarding logical partitioning can be found in the following commonly owned patents and patent applications, which are herein incorporated by reference: Ser. No. 09/672,043, filed Sep. 29, 2000, entitled "Technique for Configuring Processors in System With Logical Partitions"; and Ser. No. 09/346,206, filed Jul. 1, 1999, entitled "Apparatus for Supporting a Logically Partitioned Computer System."

As shown, the memory 116 may also include a simulator 130 which may be used to test the firmware code 118. For example, an objective of the firmware code 118 may be to configure various hardware components of the computer system 100, for example, during a boot process, in preparation of running the operating system 120. Further, the firmware 118 may serve as an interface for the operating system 120 to access hardware components, while hiding the details of such access from the operating system 120.

In any case, the simulator 130 may be generally configured to simulate the behavior of hardware targeted by the firmware 118 through the use of a set of smart buffer objects 132 that correspond to registers of the targeted hardware. The smart buffer objects 132 are generally designed to simulate the behavior of their corresponding hardware registers as defined by one or more behavior definitions 134. The behavior definitions 134 are generally developed in a hardware modeling process, in an effort to capture the behavior of corresponding hardware registers, for example, based on the actual specifications of the hardware components. An exemplary work flow for developing firmware 118 and hardware definitions 134 is shown in FIG. 2.

Developing Firmware and Modeling Hardware Behavior

Figure 2:
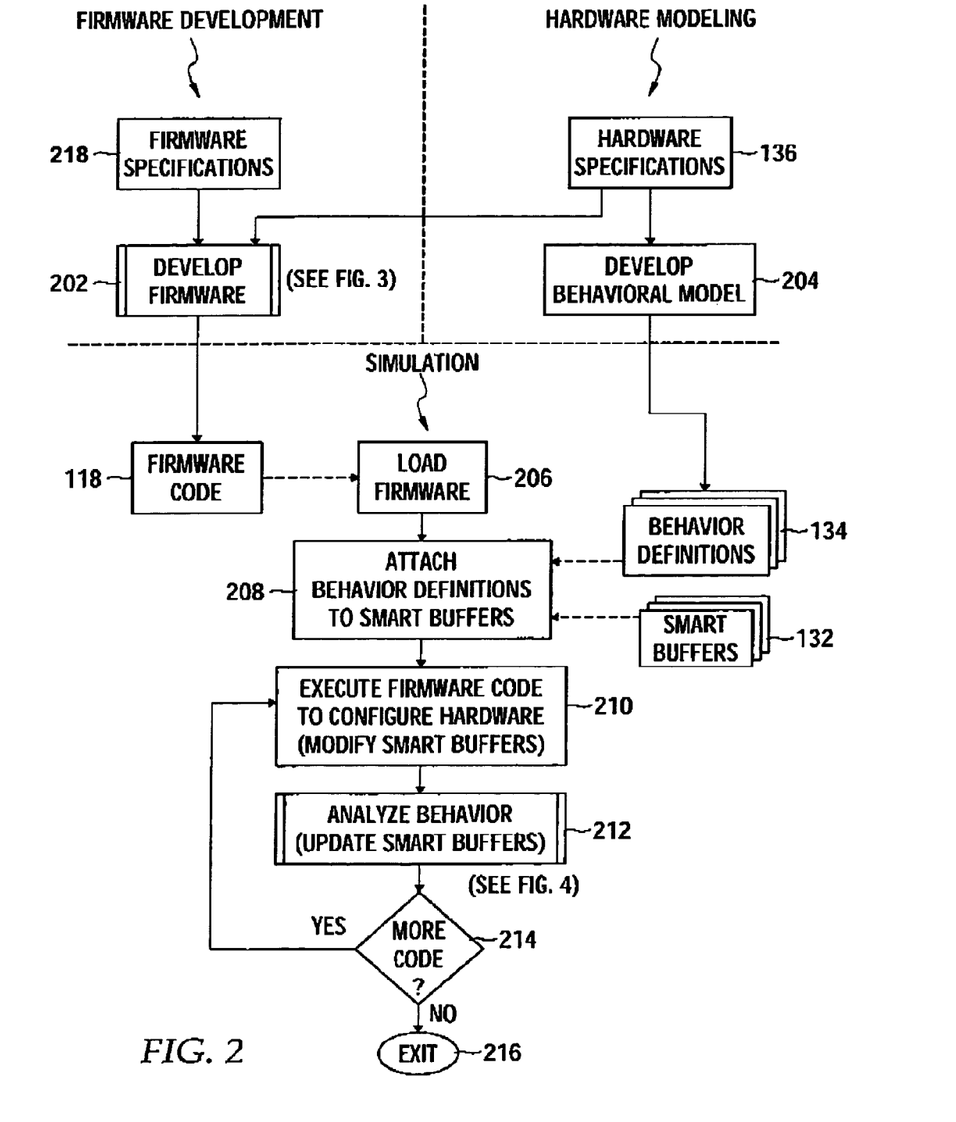
FIG. 2 is a flow chart illustrating exemplary operations for testing firmware with simulated hardware in accordance with an embodiment of the present invention.

As illustrated in FIG. 2, hardware modeling may be carried out in parallel with firmware development, in preparation of actual simulation. In addition to expediting the development process, an additional benefit to this approach is the possible separation from the development of the firmware code and the behavior definitions, which may provide a better testing environment with different individuals creating independent implementations based on the same documentation (e.g., hardware specifications 136). For example, a primary firmware developer may write the firmware code, while a tester can write the behavior definitions, which may lead to the identification of more code bugs, as well as possible documentation problems.

In any case, at step 202, firmware code 118 is developed, for example, based on a firmware specification 218 and the hardware specification 136. The firmware code 118 may include a portion of low-level code used to access the actual targeted hardware. This low-level access code may be a combination of any type of access protocols suitable for accessing target hardware registers, such as memory mapped I/O, i²C, or JTAG. For some embodiments, when developing the firmware, this low-level access code may be modified to communicate with the simulator 130 rather than the actual hardware.

Figure 3:
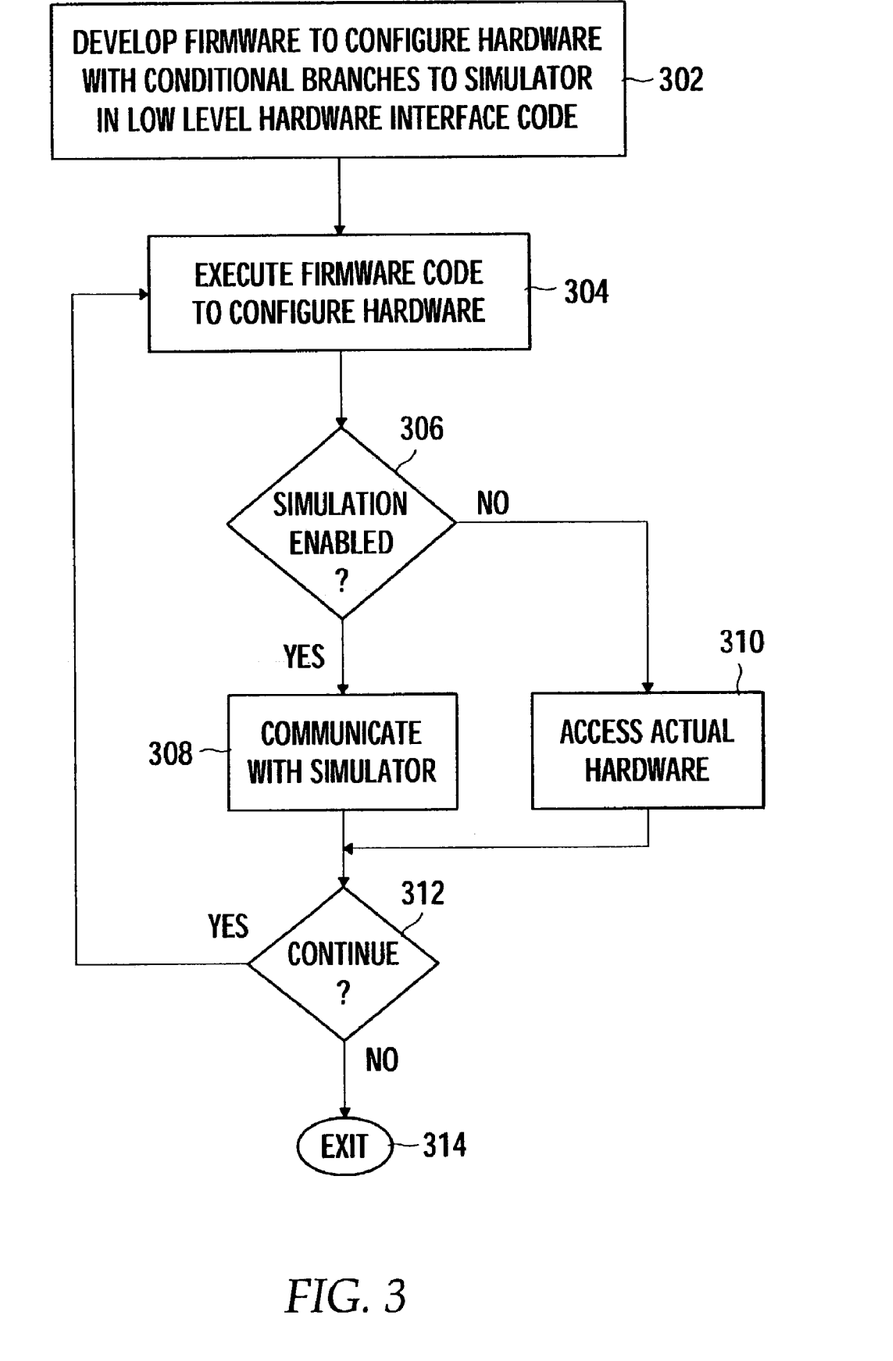
FIG. 3 is a flow chart illustrating exemplary operations for developing firmware in accordance with an embodiment of the present invention.

For example, as illustrated in FIG. 3 conditional branches may be placed in the low level code, at step 302. Upon executing the firmware code to configure hardware, at step 304, a determination is made, at step 306. as to whether simulation is enabled (e.g., via a status flag). If simulation is not enabled, the actual hardware is accessed, at step 310. On the other hand, if simulation is enabled, rather than access the actual hardware, the firmware communicates with the simulator 130, at 308. In other words, the firmware code may access smart buffers 132 modified by the simulator 130 rather than actual hardware registers. The steps 304–310 may be repeated, for example, as long as there is more code to execute or a break point is reached, as determined, at step 312. The operations are exited at step 314. Of course, rather than place conditional branches in the actual firmware code 118, a compiler flag may be used when compiling source code, to generate firmware code that either communicates with the simulator 130 or accesses the actual hardware.

Referring back to FIG. 2, at step 204, the hardware is modeled based on the hardware specifications 136 to generate behavior definitions 134. In other words, the hardware specifications 136 may contain information regarding the relational behavior of various registers of a hardware component being modeled. For example, the hardware specification 136 may describe, at the bit level, the effect modifying one register (e.g., a control register) has on another register (e.g., a corresponding status register). This behavior may be captured as one or more behavior definitions 134 associated with the register. For some embodiments, different sets of behavior definitions 134 may be created for different hardware components. For example, a library of behavior definitions 134 may be built including sets of behavior definitions 134 corresponding to different hardware components.

Capturing hardware behavior as behavior definitions 134 may be illustrated by a simple example describing two hypothetical hardware components, Chips A and B. Chip A has a Control Register (A_REG_C) and a Status Register (A_REG_S), while Chip B has a Status Register (B_REG_S). In normal operation (e.g., as indicated by the hardware specification for Chip A), setting a START bit (bit 0) in the Control Register of Chip A will execute an internal hardware procedure, the completion of which is indicated by the setting of a DONE bit (bit 13) in the Status Register. In other words, after setting the START bit to initiate the procedure, the firmware code 118 may examine the DONE bit to determine when the procedure has completed. Further, Chip B may keep a "global" status of several chips including Chip A, and the Status Register of Chip A may be mirrored in the Status Register of Chip B, for example, starting at bit 20.

Figure 4A:
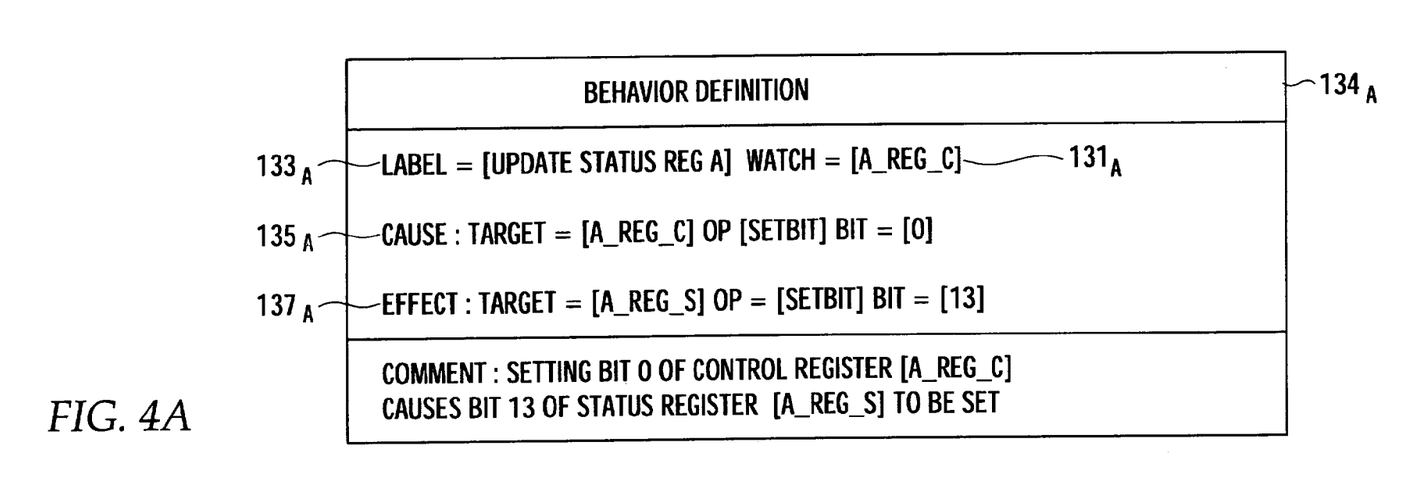
FIGS. 4A and 4B illustrate exemplary behavior definitions in accordance with an embodiment of the present invention.
Figure 4B:
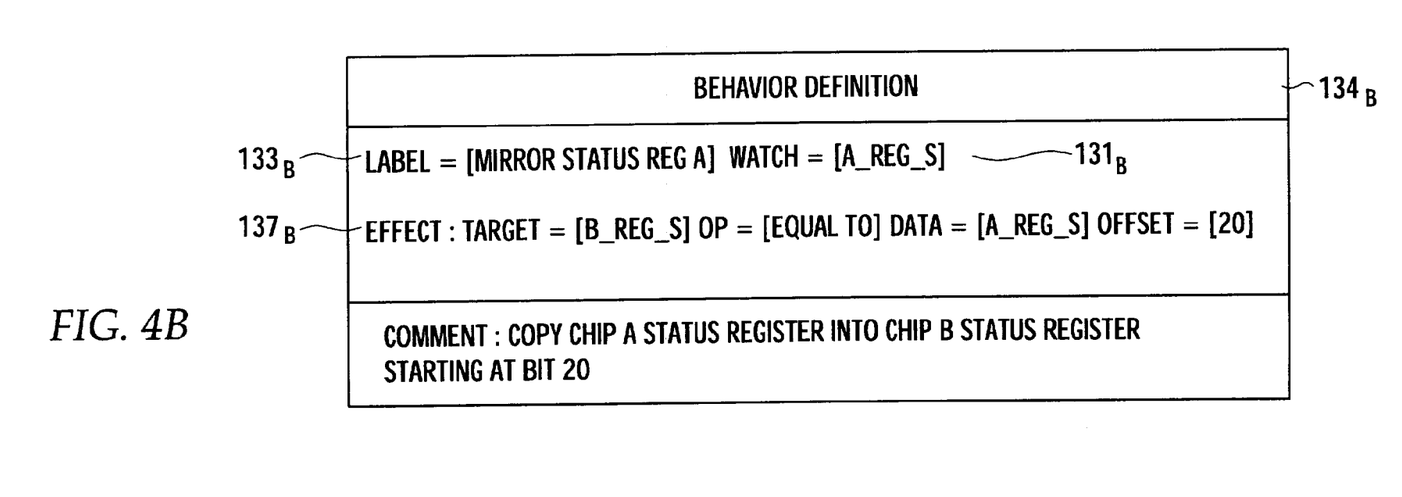

This known behavior of chip A may be captured as the exemplary behavior definitions $134_A$ and $134_B$, shown in FIGS. 4A and 4B, respectively. As illustrated in FIG. 4A, the operation that triggers the behavior may be specified in a conditional CAUSE statement $135_A$, while the actual behavior (e.g., the modification of another register) may be specified in an EFFECT statement $137_A$. In other words, the EFFECT statement may be viewed as defining the behavior action caused by the operation indicated in the CAUSE statement. In the present example, the CAUSE statement $135_A$ identifies the targeted hardware register (A_REG_C) and the type of access operation (OP) that triggers the modification specified in the EFFECT statement $137_A$ (setting bit 0). In a similar manner, the EFFECT statement $137_A$ identifies the targeted hardware register to be modified (A_REG_S) and the type of modification (setting bit 13), in the event the condition of the CAUSE statement is satisfied.

As shown, the behavior definition $134_A$ may also include an identifying LABEL $133_A$ and a WATCH parameter $131_A$ that specifies the corresponding register whose behavior is defined. Upon loading, the simulator 130 may parse behavior definitions and attach them to the corresponding smart buffers of the registers specified in the WATCH parameter. For example, the simulator 130 may attach the behavior definition $134_A$ to a smart buffer corresponding to A_REG_C. When the firmware code 118 sets bit 0 of Control Register (A_REG_C:0), the smart buffer will call a function to set bit 13 of the Status Register (A_REG_S:13).

As previously described, the Status Register of Chip A may be mirrored in the Status Register of Chip B, such that setting bit 13 of the Status Register of Chip A should be reflected in the Status Register of Chip B (by setting bit 33 due to the 20 bit offset). FIG. 4B illustrates a behavior definition 134B that captures this behavior. As shown, the behavior definition 134B does not contain any CAUSE statement. By merely specifying the Status Register of Chip A in the WATCH parameter $133_B$, the EFFECT statement $137_B$ that specifies the Status register of Chip A should be copied into the Status Register of Chip B will be evaluated any time the Status Register of Chip A is modified. In other words, the condition that triggers the modification in the EFFECT statement $137_B$ is the modification of Chip A's Status Register.

While the exemplary behavior definitions $134_A$ and $134_B$ illustrate behavior caused when a hardware register (modeled by a smart buffer 132) is modified, other behavior definitions 134 may cause behavior when a register is merely accessed for a read operation (e.g., via a register read or bit test operation). As an example, it is common for certain status bits to be cleared when a corresponding register is read (e.g., reading a timer register may clear a timer overflow flag in a status register, while reading a UART Receive Register may clear a Receive Ready bit that indicates new data has been received).

Further, in some cases, CAUSE statements may require more complex modifications to be satisfied, such as more than one bit (of more than one register) to be at a predetermined value before the CAUSE statement is satisfied. For example, certain internal functions of some chips may require that an enable bit be set before the function is enabled. Therefore, a CAUSE statement may specify that an enable bit be set, as well as a specified register be modified. In a similar manner, EFFECT statements may specify more than one modification (e.g., the modification of more than one bit in a register or modifications to more than one register).

Behavior definitions 134 may also be used to specify unexpected or "alternate behavior" in order to ensure firmware code properly handles unexpected behavior, for example due to hardware failure. As an example, the behavior definition $134_A$ shown in FIG. 4A may be modified to CLEAR bit 13 of the Status Register (A_REG_S) when bit 0 of the Control Register (A_REG_C) is set. Such alternate behavior definitions may facilitate the testing of error handling code. In other words, the modification that simulates the unexpected behavior may cause the firmware code to execute error handling code.

Analyzing Hardware Behavior With Smart Buffers

Once the firmware code 118 and behavior definitions 134 have been developed, the firmware code 118 may be tested utilizing the smart buffers 132 to simulate behavior of the actual targeted hardware registers. Simulation begins, at step 206 by loading the firmware code 118. The firmware code 118 may be loaded and run on the actual platform or in a debugger (e.g., to allow for the setting of breakpoints, the viewing/modifying of registers used by the firmware, and the like).

At step 208, the behavior definitions 134 are attached to their corresponding smart buffers 132. For example, for each smart buffer 132, a list of behavior definitions specifying that smart buffer 132 in the WATCH parameter may be generated. This list of behavior definitions 134 may then be used to analyze the behavior caused when the smart buffer 132 is later accessed by firmware. The behavior definitions 134 may be in any suitable format allowing them to be read and parsed, such as formatted text files, XML documents, database records, or any other suitable format. For some embodiments, the exact behavior definitions 134 provided for each smart buffer 132 may be specified, for example, in an effort to perform specific tests. For example, as previously described "alternate" behavior definitions 134 may be specified to cause unexpected behavior in an effort to test error handling code.

At step 210, the firmware code 118 is executed to configure hardware. In other words, as previously described, during simulation, firmware code 118 that would normally access actual hardware registers during normal operation may be redirected to communicate with the simulator 130 instead and access smart buffers 132 instead.

Figure 5:
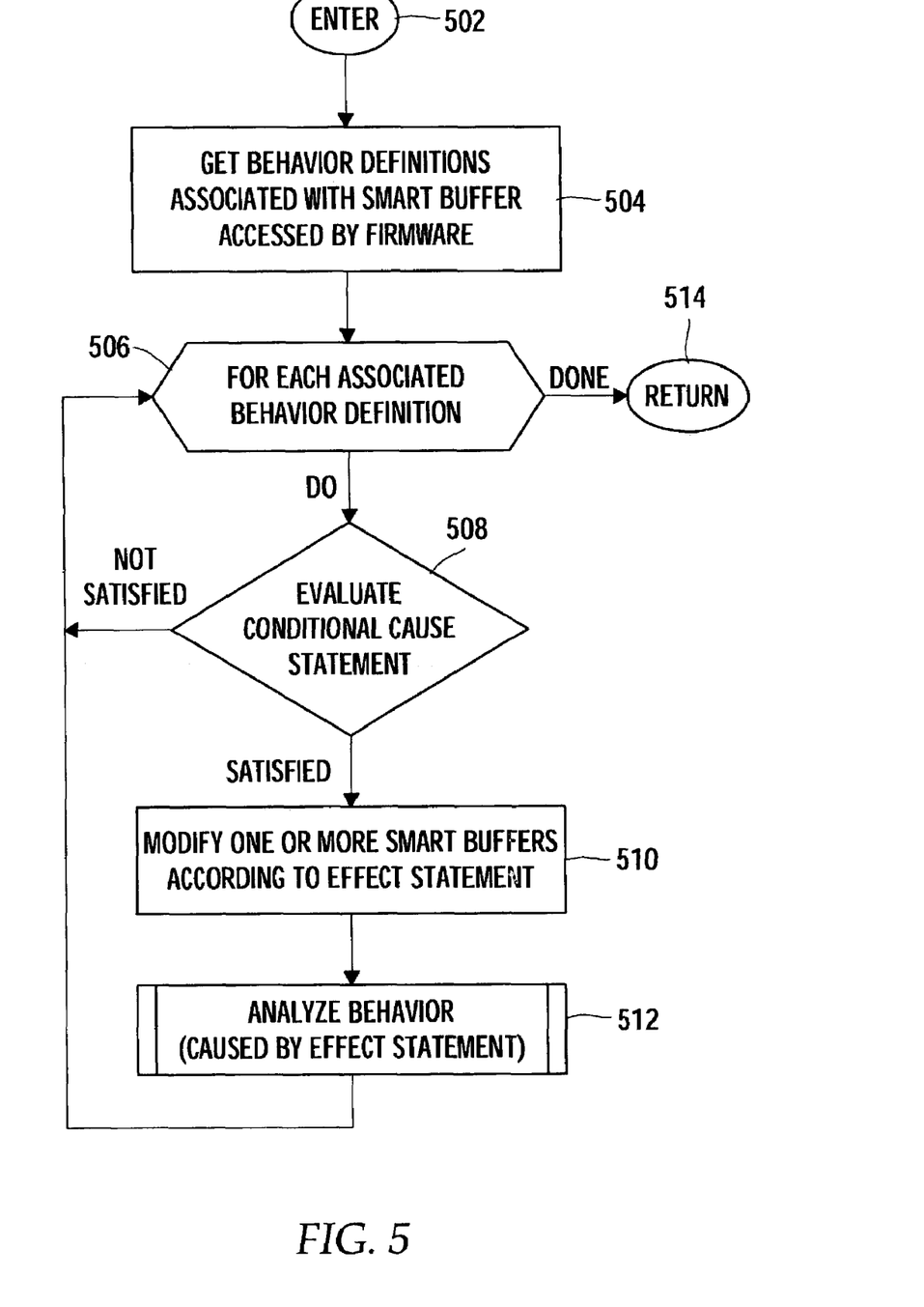
FIG. 5 is a flow chart illustrating exemplary operations for simulating hardware behavior in accordance with an embodiment of the present invention.

At step 212, upon detecting an access (e.g., any operation to read/write the smart buffer, test or modify a bit of the smart buffer) to a smart buffer 132, the simulator 130 analyzes the hardware behavior caused by the access. In other words, the simulator 130 updates smart buffers 132, as dictated by the behavior definitions 134 that were attached to the smart buffer 132 accessed by the firmware code 118. FIG. 5 illustrates exemplary operations 500 that may be performed, for example, by the simulator 130, each time a smart buffer is accessed by the firmware code 118.

The operations 500 begin at step 502 and, at step 504, the simulator 130 retrieves the behavior definitions 134 associated with the smart buffer accessed by the firmware 118. As an illustrative example, it may be assumed the firmware code 118 includes instructions to configure the aforementioned Chip A by initiating the internal hardware function described above by setting bit 0 of Chip A's Control Register. The firmware code 118 may then read Chip A's Status Register to determine when the function has completed prior to resuming other operations. As previously described, the firmware code 118 may instead access smart buffers 132 associated with the Control Register of Chip A. Therefore, (at step 504) the simulator 130 may retrieve the behavior definition $134_A$ (shown in FIG. 4A) associated with the Control Register of Chip A, as well as any other associated behavior definitions.

At step 506, a loop of operations (508–512) to be performed for each behavior definition associated with the modified smart buffer is entered. At step 508, the conditional CAUSE statement is evaluated. If the conditional CAUSE statement is not satisfied, processing continues step 506, to select the next behavior definition associated with the modified (or accessed) smart buffer.

However, if the CAUSE statement is satisfied, at step 510, one or more smart buffers 132 are modified according to the EFFECT statement of the behavior definition 134. In the current example, bit 0 of Chip A's Control Register is set to initiate an internal hardware procedure, which satisfies the CAUSE statement $135_A$ of the behavior definition $134_A$. Therefore, the behavior action specified in the EFFECT statement $137_A$ is taken, in this case, the DONE bit (13) of Chip A's Status Register is set. Having modified the smart buffer 132 associated with the Status Register of Chip A to simulate completion of the internal hardware function, the simulator 130 may return control to the firmware code 118.

However, as previously described, the behavior action specified in one behavior definition 134 may trigger behavior specified in another behavior definition 134. Therefore, at step 512, the behavior caused by modifications to smart buffers from step 510 is analyzed. In other words, step 512 may result in a recursive call to the same function to perform the same operations 500. Accordingly, care should be taken to avoid infinite recursions when developing and specifying behavior definitions 134. In this example, modifying Chip A's status register causes the behavior definition $134_B$ to be retrieved, and for the Status Register of Chip A to be copied to the Status Register of Chip B, starting at bit 20.

Assuming the modification of the Status Register of Chip B does not trigger further action (e.g., the Status Register of Chip B does not have any associated behavior definitions 134), and that the Status and Control Registers of Chip A have no additional behavior definitions 134, the operations 500 may be exited, at step 514. For example, the simulator 130 may return control to the firmware code 118, to read bit 13 of Chip A's Status Register (or bit 33 of Chip B's Status Register) to determine if the simulated internal hardware procedure has completed.

Referring back to FIG. 2, as long as there is more firmware code 118, as determined at step 214, testing of the firmware code 118 may continue by executing the firmware code, at step 210, and analyzing the behavior caused by accessing smart buffers 132, at step 212. The simulation is exited, at step 216, for example, once the code has been fully exercised, or a bug in the firmware has been found.

CONCLUSION

The present invention provides numerous advantages over prior art methods and systems for simulating hardware through the use of smart buffers that simulate the behavior of actual targeted hardware registers. As an example, rather than require manual modifications to firmware instructions in order to ensure certain execution paths in the firmware are exercised, the use of smart buffers allows the firmware to run as it would in a real product environment without manual intervention. As another example, rather than require expensive specialized equipment for emulation of targeted hardware, the use of smart buffers allows firmware tests to be run on standard computer hardware. Since the underlying hardware mechanisms are not actually being simulated, the running time is significantly reduced. Further, how well the firmware handles unexpected behavior may be easily tested through the use of alternate behavior definitions, which may lead to more robust code.

While the foregoing is directed to embodiments of the present invention, other and further embodiments of the invention may be devised without departing from the basic scope thereof, and the scope thereof is determined by the claims that follow.

What is claimed is:

1. A method of simulating, in software, a behavior of one or more hardware components, comprising:
   creating one or more smart buffer objects on a storage medium, each corresponding to a register of at least one of the hardware components;
   creating one or more behavior definitions, each associated with at least one of the smart buffer objects, wherein the behavior definition specifies a modification to a smart buffer object and wherein at least one of the behavior definitions specifies a condition that must be met prior to performing the specified modification of a smart buffer object;
   executing firmware code; and
   in response to determining that executing the firmware code accesses a first one of the smart buffer objects, modifying a second smart buffer object based on at least one behavior definition associated with the first smart buffer object, thereby simulating interaction between the firmware code and the one or more hardware components corresponding to the one or more smart buffer objects.

2. The method of claim 1, wherein the first and second smart buffer objects comprise the same smart buffer object.

3. The method of claim 1, wherein modifying a second smart buffer object based on at least one behavior definition associated with the first smart buffer object comprises:
   determining if the condition specified in the behavior definition is met; and
   if so, modifying the second smart buffer object as specified in the behavior definition.

4. The method of claim 3, wherein determining if the condition specified in the behavior definition is met comprises examining the status of a bit in the first smart buffer object.

5. The method of claim 1, further comprising, in response to modifying the second smart buffer object, modifying a third smart buffer object based on at least one behavior definition associated with the second smart buffer object.

6. The method of claim 1, wherein at least one of the behavior definitions specifies a modification to a smart buffer object based on unexpected behavior of a corresponding hardware component.

7. A computer readable storage medium containing a program for simulating a behavior of hardware components targeted by firmware code which, when executed, the program performs operations, comprising:
   creating at least a first smart buffer object and a second smart buffer object, each corresponding to a register of one of the targeted hardware components;
   associating one or more behavior definitions with each of the first smart buffer object and the second smart buffer object, each behavior definition specifying a modification to a respective one of the first smart buffer object and second smart buffer object; and
   in response to detecting an access of the first smart buffer object by the firmware code, analyzing the behavior of at least the second smart buffer object caused by accessing the first smart buffer object, based on the one or more behavior definitions associated with the first smart buffer object,
   wherein analyzing the behavior of at least the second smart buffer object caused by accessing the first smart buffer object based on the one or more behavior definitions associated with the first smart buffer object compromises, for each of the one or more behavior definitions associated with the first smart buffer object:
   determining that a condition specified by the behavior definition has been met; and
   modifying the second smart buffer object as specified in the behavior definition thereby simulating interaction between the firmware code and the targeted hardware components.

8. The computer readable storage medium of claim 7, wherein the first and second smart buffer objects comprise the same smart buffer object.

9. The computer readable storage medium of claim 7, wherein the operations further comprise analyzing the behavior of at least a third smart buffer object caused by modifying at least the second smart buffer object based on one or more behavior definitions associated with the second smart buffer object.

10. A system for simulating one or more hardware components targeted by firmware code, comprising:
   at least one processor;
   a plurality of smart buffer objects, each associated with a corresponding register of one of the hardware components;
   a plurality of behavior definitions, each associated with at least one of the smart buffer objects, wherein each behavior definition specifies a modification to at least one smart buffer object;
   firmware code executable by the at least one processor, the firmware code including instructions to access the smart buffer objects; and
   a simulator configured to detect accesses to the smart buffer objects by the firmware code and modify one or more of the smart buffer objects, based on the plurality of behavior definitions, in response to the detected accesses.

11. The system of claim 10, wherein the at least one processor is a service processor and the system further comprises one or more system processors.

12. The system of claim 10, wherein the instructions to access the smart buffers comprise instructions to communicate with the simulator.

13. The system of claim 12, wherein the instruction to access the smart buffers comprise instructions to communicate with the simulator only if the simulator is enabled.

14. The system of claim 10, wherein the simulator is configured to, in response to detecting an access, by the firmware code, of a first smart buffer object:
   access at least one behavior definition associated with the first smart buffer object; and
   modify at least the second smart buffer object based on the at least one behavior definition associated with the first smart buffer object.

15. The system of claim 14, wherein the simulator is configured to:
   determine if one or more conditions specified in the at least one behavior definition associated with the first smart buffer object is met; and
   modify at least the second smart buffer object based on the at least one behavior definition associated with the first smart buffer object only if one or more conditions are met.

16. The system of claim 10, wherein the plurality of behavior definitions comprises sets of behavior definitions, wherein each set contains behavior definitions corresponding to a different hardware component.

17. The system of claim 10, wherein:
   at least one of the behavior definitions specifies a modification to a smart buffer object based on unexpected behavior of a corresponding hardware component; and
   the firmware code comprises instructions to perform error handling in response to detecting the specified modification.

* * * * *